(12) United States Patent
Goto et al.

(10) Patent No.: US 7,126,106 B2
(45) Date of Patent: Oct. 24, 2006

(54) QUANTUM COMPUTER AND QUANTUM COMPUTATION METHOD

(75) Inventors: Hayato Goto, Kawasaki (JP); Kouichi Ichimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/235,192

(22) Filed: Sep. 27, 2005

(65) Prior Publication Data

US 2006/0169877 A1    Aug. 3, 2006

(30) Foreign Application Priority Data

Feb. 2, 2005   (JP)   ............... 2005-026654

(51) Int. Cl.
*G02F 1/01*   (2006.01)
*G02F 3/00*   (2006.01)
*G01J 1/44*   (2006.01)
*G06E 3/00*   (2006.01)

(52) U.S. Cl. ............... 250/225; 250/214 R; 359/107; 359/108

(58) Field of Classification Search ............... 250/225, 250/214 R; 359/107, 108
See application file for complete search history.

(56) References Cited

U.S. PATENT DOCUMENTS 6,314,189 B1 *  11/2001  Motoyoshi et al. ......... 380/278
6,800,837 B1    10/2004  Ichimura et al.

2005/0110106 A1    5/2005  Goto et al.

OTHER PUBLICATIONS

L.-M. Duan, et al., "Scalable Photonic Quantum Computation through Cavity-Assisted Interactions", Physical Review Letters, vol. 92, No. 12, Mar. 26, 2004, pp. 127092-1 through 127902-4.

Yun-Feng Xiao, et al., "Realizing quantum controlled phase flip through cavity QED", Physical Review A, vol. 70, Oct. 25, 2004, pp. 042314-1 through 042314-5.

Yun-Feng Xiao, et al., "Quantum CPF gates between rare earth ions through measurement", Physics Letters A, vol. 330, Aug. 12, 2004, pp. 137-141.

* cited by examiner

*Primary Examiner*—Georgia Epps
*Assistant Examiner*—Pascal M. Bui-Pho
(74) *Attorney, Agent, or Firm*—Oblon, Spivak, McClelland, Maier & Neustadt, P.C.

(57) ABSTRACT

Quantum computer includes optical systems arranged in series each of the plurality of optical systems includes first half-wave plate, first polarizing beam splitter, first switching mirror, first photodetector, first polarization rotator, optical cavity which contains atom, second switching mirror, second photodetector, second polarization rotator, and high reflection mirror, first polarization beam splitter outputting third light beam received from first switching mirror or second switching mirror to adjacent one of optical systems, third switching mirrors each provided between adjacent two optical systems, each of third switching mirrors reflecting or transmitting light beam output from one of two optical systems, light sources each providing light beam to corresponding optical system, and measurement system which measures polarization of incoming light beam.

24 Claims, 11 Drawing Sheets

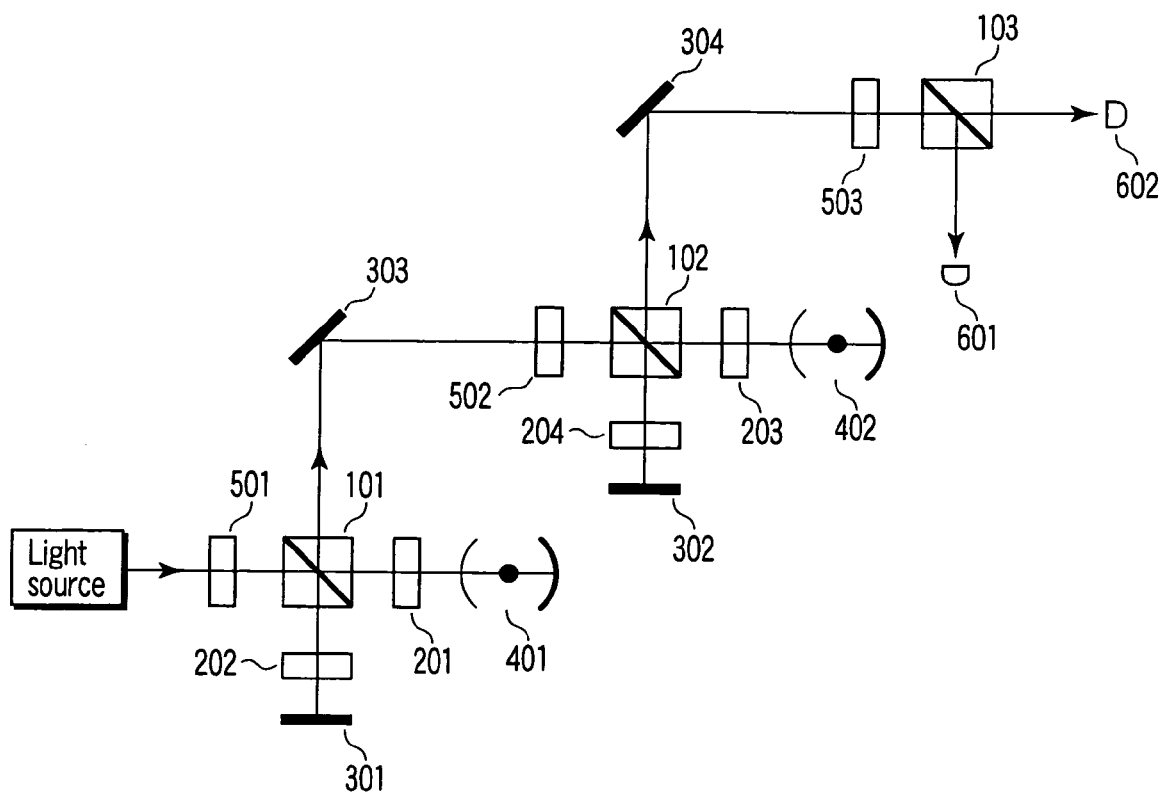
F I G. 4
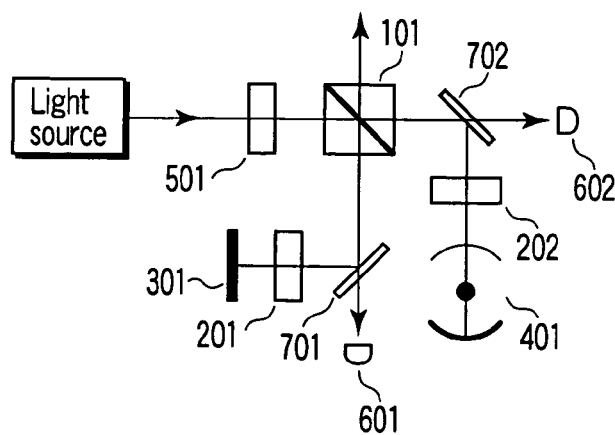
F I G. 5

QUANTUM COMPUTER AND QUANTUM COMPUTATION METHOD

CROSS-REFERENCE TO RELATED APPLICATIONS

This application is based upon and claims the benefit of priority from prior Japanese Patent Application No. 2005-026654, filed Feb. 2, 2005, the entire contents of which are incorporated herein by reference.

BACKGROUND OF THE INVENTION

1. Field of the Invention

The present invention relates to a quantum computer and quantum computation method utilizing coupling of an optical cavity with an atom.

2. Description of the Related Art

L.-M. Duan et al. have proposed a new method for realizing a controlled phase flip gate (see, for example, L.-M. Duan and H. J. Kimble, Phys. Rev. Lett. 92, 127902 (2004)). In this proposal, quantum bits are expressed by polarization of photons. However, in quantum computers, it is preferable to express quantum bits using atomic states that are more stable and easily usable as memories.

In light of this, Y.-F. Xiao et al. have proposed a controlled phase flip gate in which a change in light beam intensity in a cavity due to strong coupling between the cavity and an atom is utilized like the method of Duan, but the quantum bits are expressed by ground states of the atoms (see, for example, Y.-F. Xiao, X.-M. Lin., J. Gao, Y. Yang, Z.-F. Han, and C.-C. Guo, Phys. Rev. A 70, 042314 (2004); and Y.-F. Xiao, Z.-F. Han, Y. Yang, and C.-C. Guo, Phys. Lett. A 330, 137 (2004)).

Xiao et al. state in these papers that the methods are scalable since they exhibit a low error rate.

However, Xiao et al. suggest nothing about the specific structure of a quantum computer containing three or more quantum bits. Moreover, even if a researcher in this technical field has mastered the methods proposed by Xiao et al., it is still not obvious for them to contrive any specific structure of the quantum computer containing three or more quantum bits.

BRIEF SUMMARY OF THE INVENTION

In accordance with a first aspect of the invention, there is provided a quantum computer comprising:

a plurality of optical systems arranged in series each of the plurality of optical systems comprising:
  a first half-wave plate which receives a light beam;
  a first polarizing beam splitter which receives a light beam passing through the first half-wave plate;
  a first switching mirror which reflects or transmits a first light beam transmitted by the first polarizing beam splitter;
  a first photodetector which detects the first light beam transmitted by the first switching mirror;
  a first polarization rotator which receives the first light beam reflected by the first switching mirror;
  an optical cavity which receives the first light beam passing through the first polarization rotator and contains an atom;
  a second switching mirror which reflects or transmits a second light beam reflected by the first polarizing beam splitter;
  a second photodetector which detects the second light beam transmitted by the second switching mirror;
  a second polarization rotator which receives the second light beam reflected by the second switching mirror; and
  a high reflection mirror which receives the second light beam passing through the second polarization rotator and reflects the received light beam in a direction opposite to an incident direction of the received light beam, the first polarization beam splitter outputting a third light beam received from the first switching mirror or the second switching mirror to adjacent one of the optical systems;

a plurality of third switching mirrors each provided between adjacent two optical systems, each of the third switching mirrors reflecting or transmitting a light beam output from one of the two optical systems;

a plurality of light sources each providing the light beam to the corresponding optical system; and a measurement system which measures polarization of an incoming light beam, the measurement system comprising:
  a second half-wave plate which receives the incoming light beam output from the last-stage optical system, the last-stage optical system arranged at an down end of the plurality of optical systems:
  a second polarizing beam splitter which receives the incoming light beam passing through the second half-wave plate; and
  a pair of third and fourth photodetectors, the third photodetector detecting the incoming light beam reflected by the second polarizing beam splitter, the fourth photodetector detecting the incoming light beam transmitted by the second polarizing beam splitter.

In accordance with a second aspect of the invention, there is provided a quantum computer comprising:

a plurality of optical systems arranged in series each of the plurality of optical systems comprising:
  a first half-wave plate which receives the light beam;
  a first polarizing beam splitter which receives a light beam passing through the first half-wave plate;
  a first switching mirror which reflects or transmits a first light beam transmitted by the first polarizing beam splitter;
  a first photodetector which detects the first light beam transmitted by the first switching mirror;
  a first polarization rotator which receives the first light beam reflected by the first switching mirror;
  an optical cavity which receives the first light beam passing through the first polarization rotator and contains an atom;
  a second switching mirror which reflects or transmits a second light beam reflected by the first polarizing beam splitter;
  a second photodetector which detects the second light beam transmitted by the second switching mirror;
  a second polarization rotator which receives the second light beam reflected by the second switching mirror; and
  a high reflection mirror which receives the second light beam passing through the second polarization rotator and reflects the received light beam in a direction opposite to an incident direction of the received light beam, the first polarization beam splitter outputting a third light beam received from the first switching mirror or the second switching mirror to adjacent one of the optical systems; and a plurality of third switching mirrors each provided between adjacent two optical systems, each of the third switching mirrors reflecting or transmitting a light beam output from one of the two optical systems.

BRIEF DESCRIPTION OF THE SEVERAL VIEWS OF THE DRAWING

FIG. 4 is a view illustrating an optical system for performing a CZ gate operation on two atomic quantum bits;

FIG. 5 is a view illustrating an optical system giving extensibility to a quantum computer according to an embodiment;

DETAILED DESCRIPTION OF THE INVENTION the embodiments of the present invention have been developed in light of the above problems, and aim to provide a quantum computer and quantum computation method that are extensible in the number of quantum bits.

Quantum computers and methods according to embodiments of the invention will be described in detail, referring to the accompanying drawings.

Firstly, an explanation will be given of fundamental matters related to the quantum computers and methods of the embodiments.

If an atom is contained in an optical cavity and is strongly coupled with the cavity, when a light beam having a resonant frequency of the cavity enters the cavity, the intensity of the intracavity light is quite different from that in the case where such an atom does not exist.

In general, the strong coupling between a cavity and an atom means the coupling constant g is greater than the damping rate κ of the cavity and the relaxation rate γ of the atom (g>κ, γ).

Explaining this phenomenon in more detail, an incident light cannot enter the cavity when an atom strongly coupled with the cavity exists in the cavity, while the incident light enters the cavity when such an atom does not exist. The intensity of the incident light beam is limited. If the intensity is too high, the intensity change of the intracavity light is not caused by such an atom. Therefore, the intensity of the incident light beam must be set to as a low level as enables the intensity change to be caused. As described later, by utilizing this phenomenon, a controlled phase flip gate acting on a quantum bit expressed by polarization of a photon and a quantum bit expressed by the ground states of an atom can be realized.

The controlled phase flip gate (also called a CZ gate) is a universal gate, and is used together with one-quantum-bit gates to perform an arbitrary quantum computation. The CZ gate performs the following transformation.

$$\alpha_{00}|0\rangle|0\rangle + \alpha_{01}|0\rangle|1\rangle + \alpha_{10}|1\rangle|0\rangle + \alpha_{11}|1\rangle|1\rangle \rightarrow \alpha_{00}|0\rangle|0\rangle + \alpha_{01}|0\rangle|1\rangle + \alpha_{10}|1\rangle|0\rangle - \alpha_{11}|1\rangle|1\rangle \quad (1)$$

The CZ gate employed in this description is similar in principle to that proposed by the above-mentioned Xiao et al., but different therefrom in structure.

Figure 1:
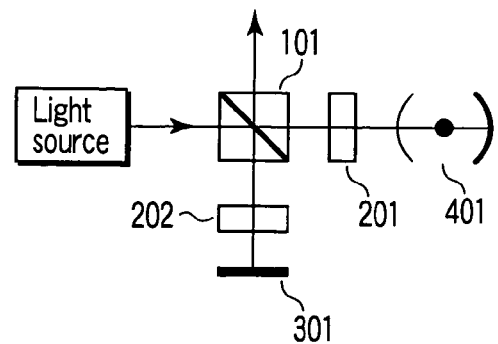
FIG. 1 is a view illustrating an optical system for performing a CZ gate operation on atomic and photonic quantum bits.

The CZ gate employed in the embodiments is substantially the CZ gate proposed by the above-mentioned Duan et al., which is performed on a quantum bit expressed by polarization of a photon and a quantum bit expressed by the ground states of an atom. Referring first to FIG. 1, an optical system for realizing this CZ gate will be described.

Figure 2:
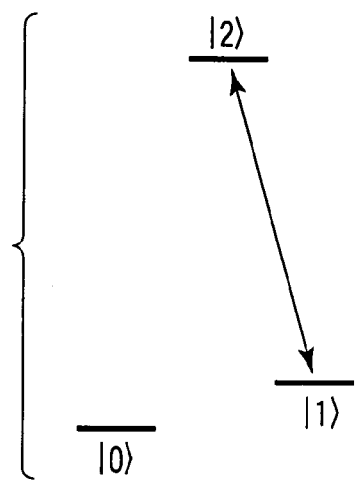
FIG. 2 is a view illustrating the energy level structure of an atom having three energy levels.

As shown in FIG. 1, this optical system comprises a polarizing beam splitter (PBS) 101, two polarization rotators (in FIG. 1, quarter-wave plates (QWPs) 201 and 202), a high reflection mirror 301 and a one-sided optical cavity 401 containing an atom with three energy levels such as shown in FIG. 2.

The PBS 101 reflects a vertically polarized light beam, and passes therethrough a horizontally polarized light beam.

The QWPs 201 and 202 invert vertical and horizontal polarizations of the light passing through the QWPs twice. The PBS 101 and QWPs 201 and 202, which have the above properties, are used to separate an incident light beam and a reflected light beam from each other. In this case, a circularly polarized light beam enters the one-sided optical cavity 401. If a Faraday rotator and a half-wave plate (HWP) are used instead of the QWPs, an incident light beam and a reflected light beam can be separated from each other, and a linearly polarized light beam enters the one-sided optical cavity 401. In the embodiment, the QWPs are used.

The high reflection mirror 301 reflects a light beam in a direction opposite to the direction of the incident.

The frequency of an incident photon is set equal to the resonant frequency of the cavity. The one-sided optical cavity 401 is, for example, a Fabry-Perot cavity composed of a partially transmitting mirror and a high reflection mirror.

Referring then to FIG. 2, the energy levels of the atom contained in the one-sided optical cavity 401 will be described. FIG. 2 is a view illustrating the energy level of the three-level atom. As shown in FIG. 2, only the atomic transition between |1> and |2> is coupled with an incident light beam (cavity mode).

In the embodiment, the stable ground states |0> and |1> are used to express quantum bits. The transition between |1> and |2> is strongly coupled with an incident light beam (cavity mode). The expression that the transition between |1> and |2> is strongly coupled with an incident light beam (cavity mode) means that the following three conditions are satisfied: i) a coupling constant between the cavity mode and the |1>–|2> transition is greater than the decay rates of both the cavity and the atom; ii) the transition frequency corresponding to the |1>–|2> transition is equal to the frequency (i.e., equal to the resonant frequency of the cavity) of the incident light beam; iii) owing to a rule of selection, the |1>–|2> transition is coupled with the circularly polarized light beam of the incident light beam, and is not coupled with a light whose polarization is opposite to that of the light mentioned above.

On the other hand, the |0>–|2> transition does not interact with the incident light beam (cavity mode) because of a large detuning. For simplicity, the incident light beam is assumed to be a single-photon pulse. In the embodiment, a coherent light beam may also be used as the incident light beam. In this case, if the emission of a light beam is stopped when a single-photon is detected, the same result as in the case of using a single-photon pulse can be acquired. Assume here that the coherent light beam is so weak that the intensity change of the intracavity light depending on the existence of the atom strongly coupled with the cavity can be observed.

Assume that the initial state is given by $$|\Psi_0\rangle = \alpha_{00}|0\rangle|V\rangle + \alpha_{01}|0\rangle|H\rangle + \alpha_{10}|1\rangle|V\rangle + \alpha_{11}|1\rangle|H\rangle, \quad (2)$$

where the first ket vectors indicate the states of the atom, and the second ket vectors indicate the polarized states of the incident photon. V and H represent vertical polarization (hereinafter referred to as "V-polarization") and horizontal polarization (hereinafter referred to as "H-polarization"), respectively. Further, assume that V and H correspond to bit "0" and bit "1", respectively.

Referring again to FIG. 1, the V-polarized photon is reflected by the PBS 101 and guided to the high reflection mirror 301. The photon is then reflected by the high reflection mirror 301 and returned to the PBS 101. The returned photon is an H-polarized one since it has passed through the QWP 202 twice. Therefore, at this time, it passes through the PBS 101.

The H-polarized photon passing through the PBS 101 is guided to the one-sided optical cavity 401. If the atomic state in the cavity 401 is |0>, the photon enters the cavity 401 and then reflects therefrom, since the cavity 401 is equivalent to a vacuum cavity in this case. In contrast, if the atomic state in the cavity 401 is |1>, the photon reflects therefrom without entering it.

As found from a simple calculation based on classical optics, the phase of a photon which enters the cavity and reflects from it differs by 180 degrees from that of a photon which reflects from the cavity without entering it. In light of this, the phase flip which occur only when the polarization of a light beam is H-polarization and the atomic state is |1> can be realized. This is equivalent to the realization of a CZ gate in which the ground states |0> and |1> of an atom are used as a control bit, and the polarized states |V> and |H> of a photon are used as a target bit. This CZ gate performs a transformation given by $$|\Psi_0\rangle = \alpha_{00}|0\rangle|V\rangle + \alpha_{01}|0\rangle|H\rangle + \alpha_{10}|1\rangle|V\rangle + \alpha_{11}|1\rangle|H\rangle \rightarrow |\Psi_1\rangle = \alpha_{00}|0\rangle|H\rangle + \alpha_{01}|0\rangle|V\rangle + \alpha_{10}|1\rangle|H\rangle - \alpha_{11}|1\rangle|V\rangle \quad (3)$$

In the above expression, the replacement of |V> and |H> is caused by the QWPs 201 and 202.

As described above, a CZ gate acting on atomic and photonic quantum bits is realized simply by applying the photon to a cavity strongly coupled with the atom, apart from the replacement of the V and H polarizations.

Figure 3:
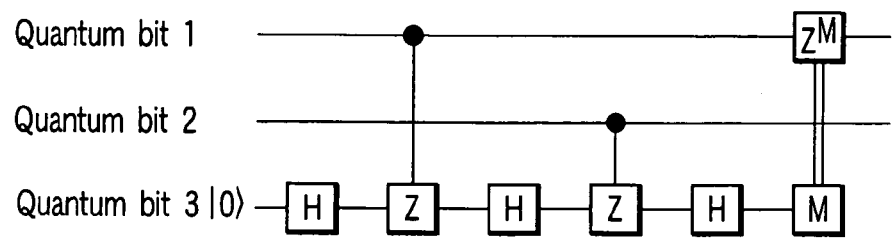
FIG. 3 is a view illustrating a quantum circuit equivalent to a CZ gate acting on quantum bit 1 and quantum bit 2, which uses additional quantum bit 3.

Referring then to FIG. 3, a description will be given of the fact that a CZ gate between two atoms can be realized using the CZ gate between the atom and the photon. FIG. 3 is a view illustrating a quantum circuit equivalent to a CZ gate acting on quantum bit 1 and quantum bit 2, which uses additional quantum bit 3.

In FIG. 3, M indicates bit reading, and $Z^M$ indicates that if the result of M is 0, nothing is performed, whereas if the result of M is 1, a phase flip gate (hereinafter referred to as "a Z gate") operation is performed. The Z gate operation is defined by $$|0\rangle \rightarrow |0\rangle, \quad |1\rangle \rightarrow -|1\rangle \quad (4)$$

Further, H in FIG. 3 represents an Hadamard gate (hereinafter referred to "an H gate"), which is defined by $$|0\rangle \rightarrow \frac{|0\rangle + |1\rangle}{\sqrt{2}}, \quad |1\rangle \rightarrow \frac{|0\rangle - |1\rangle}{\sqrt{2}} \quad (5)$$

The H gate can be realized using an HWP in the case of polarization of a photon.

The quantum circuit shown in FIG. 3 is equivalent to a CZ gate acting on quantum bits 1 and 2. Explaining in more detail, the CZ gate acting on quantum bits 1 and 2 can be realized by an H gate acting on additional quantum bit 3, CZ gates acting on quantum bits 1 and 3 and on quantum bits 2 and 3, measurement of quantum bit 3, and a Z gate operation acting on quantum bit 1 which is performed or not performed depending on the measurement result. This will now be described briefly. Assume that the initial state is given by $$|\Psi_0\rangle = (\alpha_{00}|00\rangle + \alpha_{01}|01\rangle + \alpha_{10}|10\rangle + \alpha_{11}|11\rangle)|0\rangle \quad (6)$$

In this case, the state of the quantum circuit immediately before bit reading M is given by $$|\psi_1\rangle = \frac{(\alpha_{00}|00\rangle + \alpha_{01}|01\rangle + \alpha_{10}|10\rangle - \alpha_{11}|11\rangle)|0\rangle + (\alpha_{00}|00\rangle + \alpha_{01}|01\rangle - \alpha_{10}|10\rangle + \alpha_{11}|11\rangle)|1\rangle}{\sqrt{2}} \quad (7)$$

In accordance with the result of bit reading M performed thereafter, quantum bits 1 and 2 are varied in the following manners:

$$|\Psi_2\rangle = \alpha_{00}|00\rangle + \alpha_{01}|01\rangle + \alpha_{10}|10\rangle - \alpha_{11}\rangle$$

$$|\Psi_2\rangle = \alpha_{00}|00\rangle + \alpha_{01}|01\rangle - \alpha_{10}|10\rangle + \alpha_{11}\rangle \quad (8)$$

Accordingly, if nothing is done when quantum bit 3 is 0, and a Z gate operation is performed when quantum bit 3 is 1, the state becomes $$|\Psi_3\rangle = \alpha_{00}|00\rangle + \alpha_{01}|01\rangle + \alpha_{10}|10\rangle - \alpha_{11}\rangle \quad (9)$$

Thus, it is found that a CZ gate acting on quantum bits 1 and 2 can be realized by the quantum circuit shown in FIG. 3.

Here, a Z gate acting on the atomic quantum bit can be realized by the Raman transition. The Raman transition indicates a phenomenon in which Rabi oscillation between |0> and |1> is caused by a light beam of two frequencies the difference of which is equal to the |0>–|1> transition frequency, and which do not equal the |0>–|2> and |1>–|2> transition frequencies.

To perform a CZ gate operation on two atomic quantum bits, in the quantum circuit of FIG. 3, quantum bits 1 and 2 are expressed by the respective atomic states, and quantum bit 3 is expressed by polarization of the photon. Further, CZ gates acting on quantum bits 1 and 3 and on quantum bits 2 and 3 are performed using the scheme shown in FIG. 1.

Referring to FIG. 4, it will be described how the quantum circuit of FIG. 3 is realized using the scheme shown in FIG. 1. FIG. 4 shows an optical system for performing a CZ gate operation on two atomic quantum bits.

As shown in FIG. 4, the optical system comprises PBSs 101, 102 and 103, QWPs 201, 202, 203 and 204, high reflection mirrors 301, 302, 303 and 304, one-sided optical cavities 401 and 402, HWPs 501, 502 and 503, and photodetectors 601 and 602.

The HWPs 501 to 503 provide H gates acting on photonic quantum bits expressed by polarization as mentioned above.

The photodetectors 601 and 602 detect whether photons come or not.

The other device components are similar to those shown in FIG. 1.

Quantum bits 1, 2 and 3 shown in FIG. 3 are expressed by the ground states of an atom in the one-sided optical cavity 401 (FIG. 4), by those of an atom in the one-sided optical cavity 402 (FIG. 4), and by the polarization of a photon, respectively. As mentioned above, |0> and |1> of the photonic quantum bit correspond to V polarization and H polarization, respectively.

In the CZ gate shown in FIG. 1, polarization replacement occurs as indicated in the expression (3). In light of the replacement, to realize the quantum circuit of FIG. 3 by the optical system shown in FIG. 4, it is sufficient if the HWPs 502 and 503 perform a gate operation (hereinafter referred to as "the H' gate operation") given by the following expression, which differs only in sign from the H gate operation given by the expression (5).

$$|0\rangle \to \frac{|0\rangle - |1\rangle}{\sqrt{2}}, |1\rangle \to \frac{|0\rangle + |1\rangle}{\sqrt{2}} \quad (10)$$

The operation of the H' gate is equivalent to that of the H gate after a NOT gate.

Further, if the HWP 501 also performs the H' gate operation, an H-polarized light beam is used as an incident light beam instead of a V-polarized light beam. Since it is simple if all the HWPs have the same function, it is hereinafter assumed that all the HWPs are used to perform the H' gate operation, and an H-polarized light beam is used as an incident light beam.

From the above, it is found that the optical system of FIG. 4 can realize a CZ gate on two atomic quantum bits using a photon. However, it is not obvious how to construct the optical system in order to increase the number of quantum bits. The embodiment of the invention proposes a method that enables a quantum computer using the CZ gate of FIG. 4 to employ as many quantum bits as possible in principle. This method will now be described.

The first two of the three PBSs shown in FIG. 4, i.e., the PBSs 101 and 102, are used to perform CZ gates on the atomic and photonic quantum bits, while the last PBS 103 is used to measure polarization of a photon. To make the quantum computer extensible, these two functions are made to be executed by a single PBS. As described later, to this end, it is sufficient to use a special mirror (hereinafter referred to as "the switching mirror) which can switch its reflectivity between low (for high transmission) and high (for high reflection).

Referring to FIG. 5, an optical system for imparting extensibility to a quantum computer will be described. FIG. 5 shows an optical system in which a single polarizing beam splitter functions for both a quantum gate and a polarization measuring unit, by using a switching mirror that can switch its reflectivity between low (for high transmission) and high (for high reflection).

The optical system of FIG. 5 is acquired by adding, to the optical system of FIG. 1, an HWP 501, photodetectors 601 and 602, and switching mirrors 701 and 702. When the switching mirror has high reflection, the optical system of FIG. 5 executes a CZ gate operation on atomic and photonic quantum bits after an H' gate operation on the photonic quantum bit. In contrast, when the switching mirror performs high transmission, the optical system functions as a polarization-measuring unit for measuring polarization of a photon after an H' gate operation on the photonic quantum bit. If optical systems similar to the above are prepared and connected to each other via switching mirrors, a CZ gate operation can be performed on quantum bits corresponding to atoms included in any adjacent two of the optical systems. Further, when the optical systems are connected using the switching mirrors, a photon can be directly guided from the outside to any one of the optical systems via the corresponding switching mirror.

Figure 6:
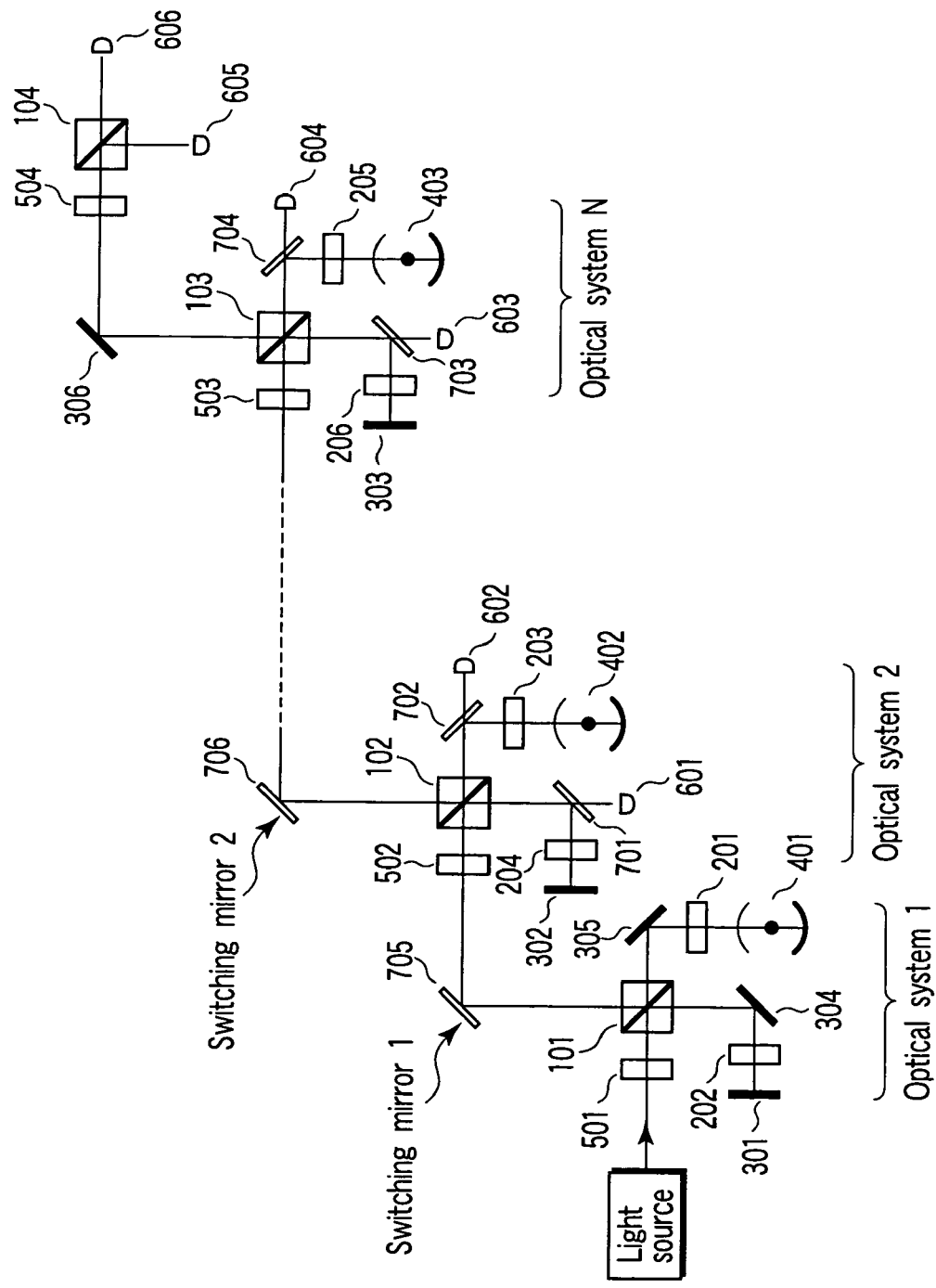
FIG. 6 is a view illustrating the quantum computer of the embodiment.

Referring to FIG. 6, a description will be given of how to connect the optical systems. FIG. 6 shows a quantum computer according to the embodiment.

As shown in FIG. 6, optical systems, i.e., an optical system 1, optical system 2, . . . , optical system N (N indicates the total number of the optical systems) starting from the left, are connected by switching mirrors. The switching mirror k connects the optical system k to the optical system (k+1) (k=1, 2, . . . , N–1). The optical system 2, . . . , optical system N are similar to the optical system shown in FIG. 5. However, the optical system 1 and the optical system after the optical system N, shown in FIG. 6, are not necessarily similar to that of FIG. 5. Since the optical system 1 does not need to measure polarization of a photon, it may not include photodetectors and switching mirrors. Further, since the optical system after the optical system N merely measures polarization, it only includes a PBS, photodetectors, and an HWP for an H' gate operation.

When optical systems are connected as shown in FIG. 6, a CZ gate operation can be performed on quantum bits corresponding to atoms included in any adjacent two of the optical systems. As a result, a quantum computer in which as many quantum bits as possible are employed can be constructed.

Figure 7:
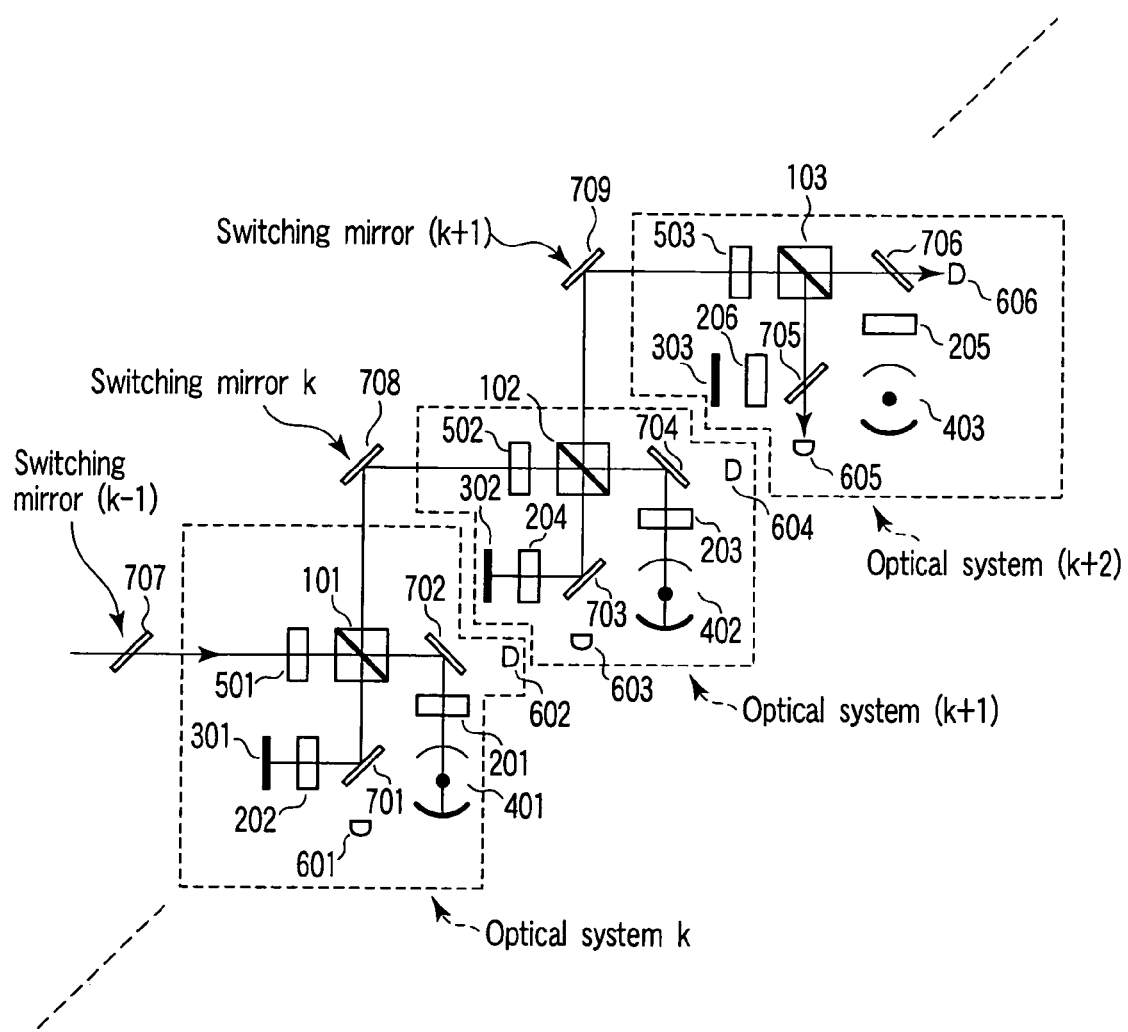
FIG. 7 is a view useful in explaining how to realize a CZ gate by the quantum computer of FIG. 6.

Referring then to FIG. 7, a description will be given of how to execute a CZ gate operation on quantum bits k and (k+1) in FIG. 6, where the quantum bit expressed by the ground states of the atom in the optical system k in FIG. 6 is called quantum bit k.

As shown in FIG. 7, a single H-polarized photon pulse enters the optical system k through a switching mirror (k−1) 707 set for high transmission. Using the switching mirrors 701 and 702 in the optical system k for high reflection, a CZ gate operation is performed on the quantum bit k and the photonic quantum bit. Using the switching mirror k 708 for high reflection, the photon is guided to the optical system (k+1). Using the switching mirrors 703 and 704 in the optical system (k+1) for high reflection, a CZ gate operation is performed on the quantum bit (k+1) and the photonic quantum bit. Using the switching mirror (k+1) 709 for high reflection, the photon is guided to the optical system (k+1). Using the switching mirrors 705 and 706 in the optical system (k+2) for high reflection, polarization of the photon is measured. In accordance with the measurement result, a Z gate operation is performed on the quantum bit k.

By the above operation, a CZ gate acting on the quantum bits k and (k+1) is realized. At the same time, a CZ gate acting on the quantum bits m and (m+1) (m<k−2, m>k+2) can be also realized. Thus, the quantum computer of the embodiment can employ as many quantum bit as possible, and can perform two-quantum-bit gate operations in a parallel manner.

Figure 8:
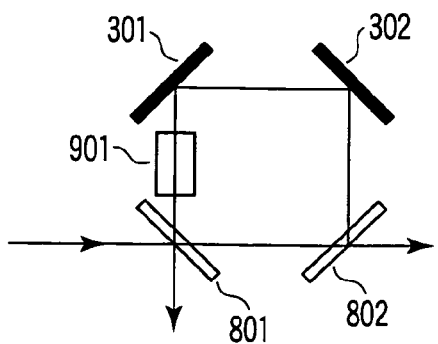
FIG. 8 is a view illustrating how to realize a switching mirror using a ring cavity.
Figure 9:
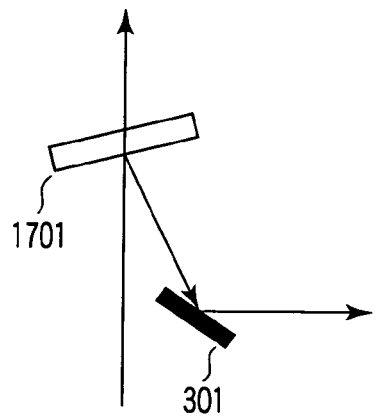
FIG. 9 is a view illustrating how to realize a switching mirror using an etalon.

Referring to FIGS. 8 and 9, implementation of a switching mirror will be described. FIG. 8 shows a case where a ring cavity is used as a switching mirror, while FIG. 9 shows a case where an etalon is used as a switching mirror.

The ring cavity can adjust the cavity length. As shown in FIG. 8, the ring cavity comprises input/output mirrors 801 and 802, high-reflection mirrors 301 and 302, and cavity length adjuster 901. The input/output mirrors 801 and 802 have the same transmission factor. The cavity length adjuster 901 adjusts the optical cavity length. The adjuster 901 can be formed of an electrooptic modulator if the adjustment is based on a change in refractive index, or formed of a piezoelectric transducer if the adjustment is based on a physical distance. The electrooptic modulator changes the optical distance by changing the refractive index, which depends on an applied voltage. Since the electrooptic modulator exhibits a quicker response than the piezoelectric transducer, if the cavity length adjuster 901 utilizes the electrooptic modulator, the cavity length can be adjusted quickly.

In the above structure, if the cavity length adjuster 901 sets the cavity length to a value that causes the cavity not to resonate with an incident light beam, the incident light beam is reflected therefrom, whereas if the adjuster 901 sets the cavity length to a value that causes the cavity to resonate with an incident light beam, the incident light beam is transmitted therethrough. Thus, the ring cavity can be used as a switching mirror.

The etalon 1701 shown in FIG. 9 transmits or reflects a light beam depending upon the incident angle of the light beam. In other words, the etalon 1701 can be used as a switching mirror by adjusting the incident angle of the light beam. The incident angle is adjusted by, for example, rotating the etalon 1701 about an axis. If a high reflection mirror 301 is prepared as shown in FIG. 9, the direction of the light beam reflected from the etalon 1701 can be adjusted.

Figure 10:
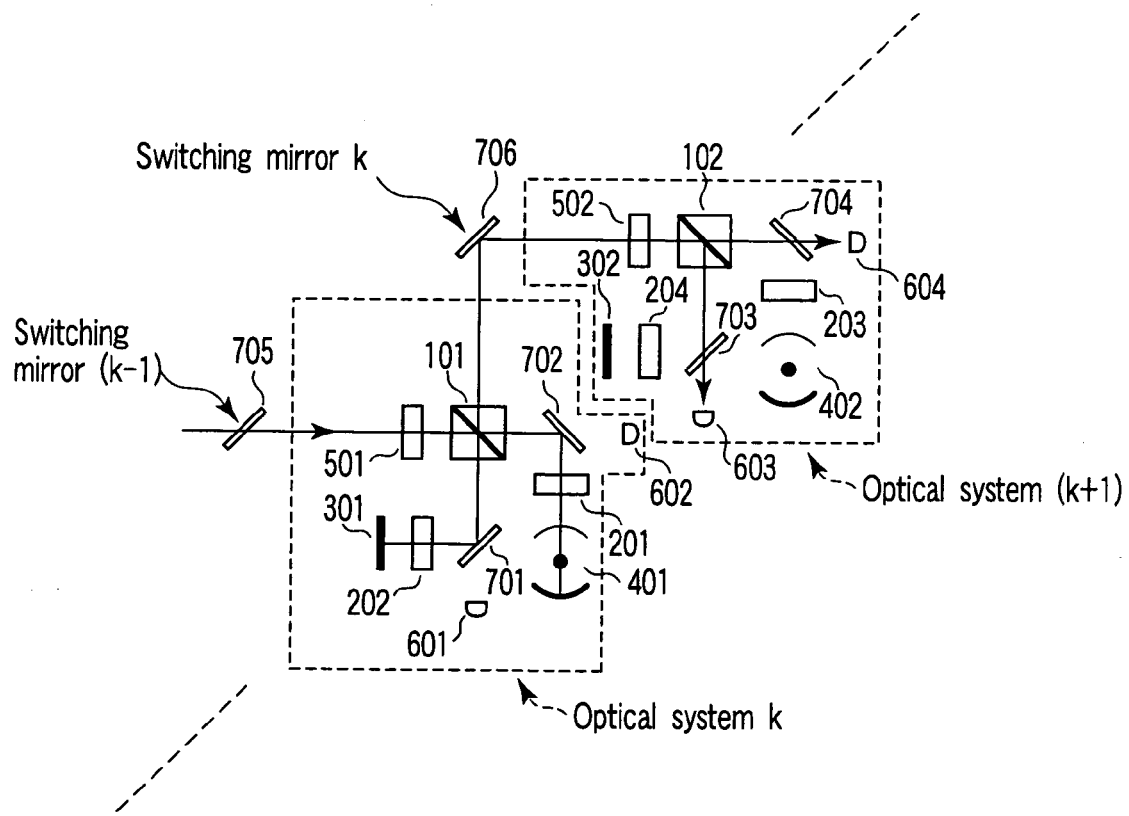
FIG. 10 is a view useful in explaining a method for reading a quantum bit in the quantum computer of FIG. 6.

Referring to FIG. 10, the method for reading a quantum bit will be described.

In this case, the quantum bit k is read. Using the switching mirror (k−1) 705 for high transmission, a single H-polarized photon pulse is guided to the optical system k. Using the switching mirrors 701 and 702 in the optical system k for high reflection, a CZ gate operation is performed on the quantum bit k and the photonic quantum bit. Using the switching mirror k 706 for high reflection, the photon is guided to the optical system (k+1). Using the switching mirrors 703 and 704 in the optical system (k+1) for high reflection, polarization of the photon is measured. As a result, reading of the quantum bit k can be realized, as will be described. Thus, the quantum computer of the embodiment can also perform reading of a quantum bit efficiently.

Figure 11:
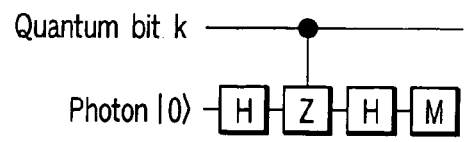
FIG. 11 is a view illustrating a quantum-circuit expression for FIG. 10.

Referring to the quantum circuit shown in FIG. 11, the principle of reading the quantum bit k will be described. FIG. 11 is a quantum circuit diagram useful in explaining why the method shown in FIG. 10 enables to read the quantum bit k.

The quantum circuit of FIG. 11 is a quantum-circuit expression for FIG. 10. In the quantum circuit of FIG. 11, the input of the photonic quantum bit is |0>, and is subjected to an H gate operation. This quantum circuit is a circuit for reading the quantum bit k. Further, this reading method can be applied to both the quantum bit k and quantum bit m (m<k−2, m>k+2) at the same time. Thus, in the quantum computer of the embodiment, quantum bit reading can also be performed in a parallel manner.

Figure 12:
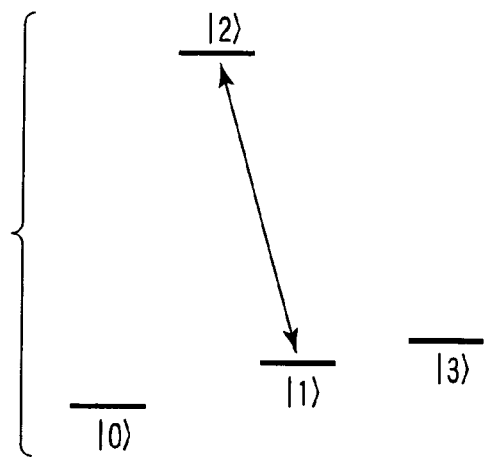
FIG. 12 is a view illustrating the energy level structure of an atom having four energy levels.

Further, in the quantum computer of the embodiment, if four energy levels (including three lower level states |0>, |1> and |3>, and one upper level |2>) are used instead of three energy levels, a CZ gate operation can also be performed on quantum bits corresponding to atoms contained in cavities which are not adjacent to each other. Referring to FIG. 12, the case of using the four-level atoms will be described.

To perform a CZ gate operation on quantum bits k and (k+n) (n is an integer not less than 2), |1> of the quantum bits (k+1) to (k+n−1) are shifted to |3>, and the CZ gates are performed on the quantum bits k and (k+n) in a similar manner to that on the quantum bits k and (k+1), with the switching mirrors k to (k+n−1) set for high reflection. This is because the cavities (k+1) to (k+n−1) are equivalent to a vacant cavity, and hence a photon enters the cavity (k+n) in the same state as that in which it enters the optical system (k+1). Thus, a CZ gate operation can also be performed on quantum bits corresponding to atoms contained in cavities that are not adjacent to each other.

As described above, a special mirror having its reflectivity changeable between low and high, which can be implemented by a ring cavity having an adjustable cavity length or by an etalon having an adjustable incident angle, enables a single polarizing beam splitter to serve for both a CZ gate and a polarization measuring unit. As a result, a controlled phase flip gate can be performed on any two quantum bits with connected optical systems of the same structure.

As explained above, in the embodiment, atomic stable states are used as quantum bits, and the phenomenon is utilized in which the intensity of a light in an optical cavity varies because of strong coupling of the cavity with the atom when a light beam enters the cavity. As a result, the embodiment of the invention can provide a quantum computer and quantum computation method in which two quantum bit gate operations can be performed in a parallel manner, and the number of quantum bits can be easily increased.

Examples according to the embodiment of the invention will be described.

EXAMPLE 1

Figure 13:
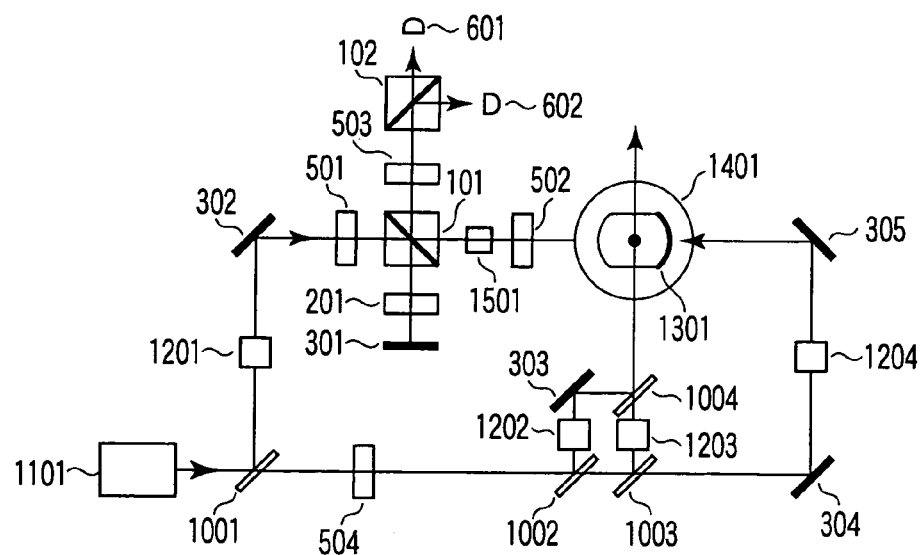
FIG. 13 is a view illustrating a quantum computer for performing a CZ gate operation on atomic and photonic quantum bits, according to example 1.

Referring to FIG. 13, a description will be given of an example of the CZ gate on atomic and photonic quantum bits shown in FIG. 1.

To confirm whether a CZ gate therebetween is realized or not, bit reading previously described with reference to FIG. 10 is performed. Explaining in more detail, first an atom is preset in a certain known state, then the process shown in FIG. 10 is performed on the atom to measure the state of the atom, and finally it is verified that the measured state corresponds to the preset certain state. When the CZ gate and the bit reading have succeeded, a V-polarized light beam is observed if the preset certain state of the atom is |0>. In contrast, if the preset certain state of the atom is |1>, an H-polarized light beam has to be observed. Accordingly, this example can also be regarded as an example of the reading method.

In example 1, $Pr^{3+}$ ions contained in $Y_2SiO_5$ crystal are used as atoms having such three levels as shown in FIG. 2. The $Pr^{3+}$ ions have the energy level structure shown in FIG. 14. Further, the $Pr^{3+}$ ions have the property that they absorb only a linearly polarized light beam. In light of this, in example 1, a Faraday rotator 1501 and HWP 502 are provided, instead of a QWP, in front of an optical cavity 1301 so that a linearly polarized light beam enters the cavity 1301. The optical cavity 1301 is formed by mirror-polishing the surface of the crystal. The orientation of the crystal is set so that maximum absorption of a V-polarized light beam can be realized. Accordingly, the HWP 502 in front of the optical cavity 1301 is adjusted to apply a V-polarized light beam to the cavity 1301.

In this example, the cavity length is 10 mm, the waist radius of the cavity mode is 5 μm, and the transmittance of the input mirror is $10^{-6}$. In this case, the coupling constant g between the cavity mode and the atom at the waist is 30 kHz, and the damping rate κ of a photon in the cavity mode is 4 kHz. Further, the relaxation rate γ of the exited state of the ion is about 6 kHz. Since in this case, the condition g>κ, γ is satisfied, the coupling of the cavity with the atom in this example is strong.

The optical cavity 1301 is placed in a cryostat 1401 and kept at 1.4 K by liquid helium therein. A ring dye laser 1101 having a stabilized frequency is used as a light source. The output of the ring dye laser 1101 is an H-polarized light beam. An HWP 504 is provided for converting the output of the laser 1101 into a V-polarized light beam. Acoustooptic modulators 1201 to 1204 perform frequency adjustment.

In example 1, firstly, an initial state in which only one ion is related to a gate operation is prepared. To this end, firstly, a light beam that resonates with the optical cavity 1301 is applied thereto from the input mirror (i.e., from the left of the optical cavity 1301 in FIG. 13) for a while (for about 1 second). As a result, the ions contained in the cavity mode and having an energy level coupled with the cavity mode are made to be in the states which are not coupled with the mode.

Subsequently, a light beam, whose direction is vertical to the cavity mode, of a frequency higher by 17.30 MHz than the resonant frequency of the cavity is applied to the waist. As a result, the ions positioned near the waist can be returned to the energy level that is coupled with the cavity mode. After that, a light beam is guided to the high-reflection mirror of the cavity 1301 (i.e., from the right of the optical cavity 1301 in FIG. 13). While scanning the frequency of the light beam, the intensity of a light beam output through the input mirror is measured. As a result of the measurement, peaks away from each other by 9.5 kHz were observed. This result indicates that one ion is coupled with the cavity mode since the coupling constant g is 30 kHz (9.5=2×30/2π). Thus, the state in which only one ion related to the gate operation exists in the cavity mode can be prepared. Moreover, the state of the ion is |1> in FIG. 14, which means that the ion is prepared in a known initial state.

Figure 15:
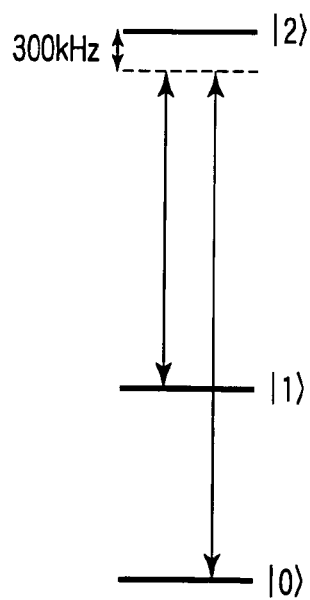
FIG. 15 is a view illustrating light beam frequencies for performing the Raman transition.

After thus preparing one ion of |1>, a weak H-polarized coherent light beam with an intensity 1 fW (hereinafter, a "weak coherent light beam" indicates a coherent light beam having an intensity of 1 fW) was applied to the cavity via the HWP 501, and a light beam reflected therefrom was measured by photodetectors 601 and 602, with the result that a V-polarized photon was acquired. Further, after preparing one ion of |1>, two light beams having two frequencies as shown in FIG. 15 was applied to the ion so that the ion was shifted to |0> by the Raman transition, and the same experiment as the above was performed. As a result, a V-polarized photon was observed. These results indicate that a CZ gate operation on atomic and photonic quantum bits succeeded.

EXAMPLE 2

Figure 16:
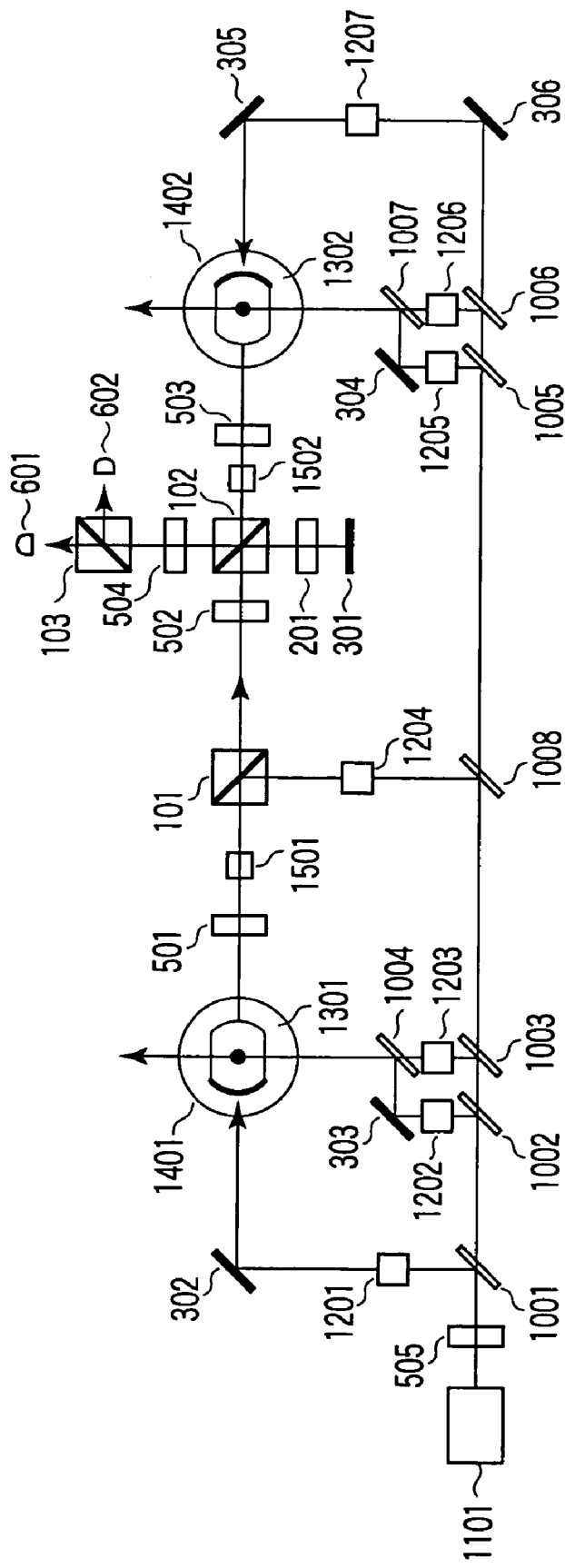
FIG. 16 is a view illustrating a quantum computer, according to example 2, for performing a CZ gate operation on atomic and photonic quantum bits, utilizing a single-photon pulse.

In example 2, a single-photon pulse is guided into a cavity, unlike example 1. In example 1, a weak coherent light beam is guided to the cavity. Referring to FIG. 16, a description will be given of a quantum computer, according to example 2, in which a CZ gate operation is performed on an atom and a photon using a single-photon pulse.

The right side system of FIG. 16 (i.e., the optical systems located rightward with respect to the PBS 101, acoustooptic modulator 1204 and beam splitter 1008) are similar to those employed in example 1 of FIG. 13 except that the incident light beam is a single-photon pulse. The left side system of FIG. 16 (including the PBS 101, acoustooptic modulator 1204 and beam splitter 1008) are used to generate a single-photon pulse. An optical cavity 1301 included in the left side system is similar to an optical cavity 1302 for a CZ gate.

A method for generating a single-photon pulse using the left side system will be described. Firstly, a state in which only one ion is in |0> is prepared in the left cavity 1301 by the same method as employed in example 1. Subsequently, a light beam of a frequency higher by 17.30 MHz than the resonant frequency of the optical cavity 1301 is gradually applied to the ion, thereby shifting the state of the ion (atom) to |1> and generating a single photon in the cavity mode via adiabatic passage based on the principle of quantum mechanics. After a while, a single photon in the cavity mode is ejected from the right hand mirror of the optical cavity 1301. The ejected photon, which is V-polarized, is converted into an H-polarized photon by the HWP 501 and the Faraday rotator 1501. The H-polarized photon is guided to the right side optical system through the PBS 101. Thus, a CZ gate operation can be realized using a single-photon pulse.

Also in example 2, it was found as in example 1 that when the state of the atom in the right hand optical cavity 1301 was initially set to |0>, a V-polarized photon was observed, while when the state of the atom was initially set to |1>, an H-polarized photon was observed. From these results, it is verified that a CZ gate operation between the atom and the photon succeeded.

EXAMPLE 3

Figure 17:
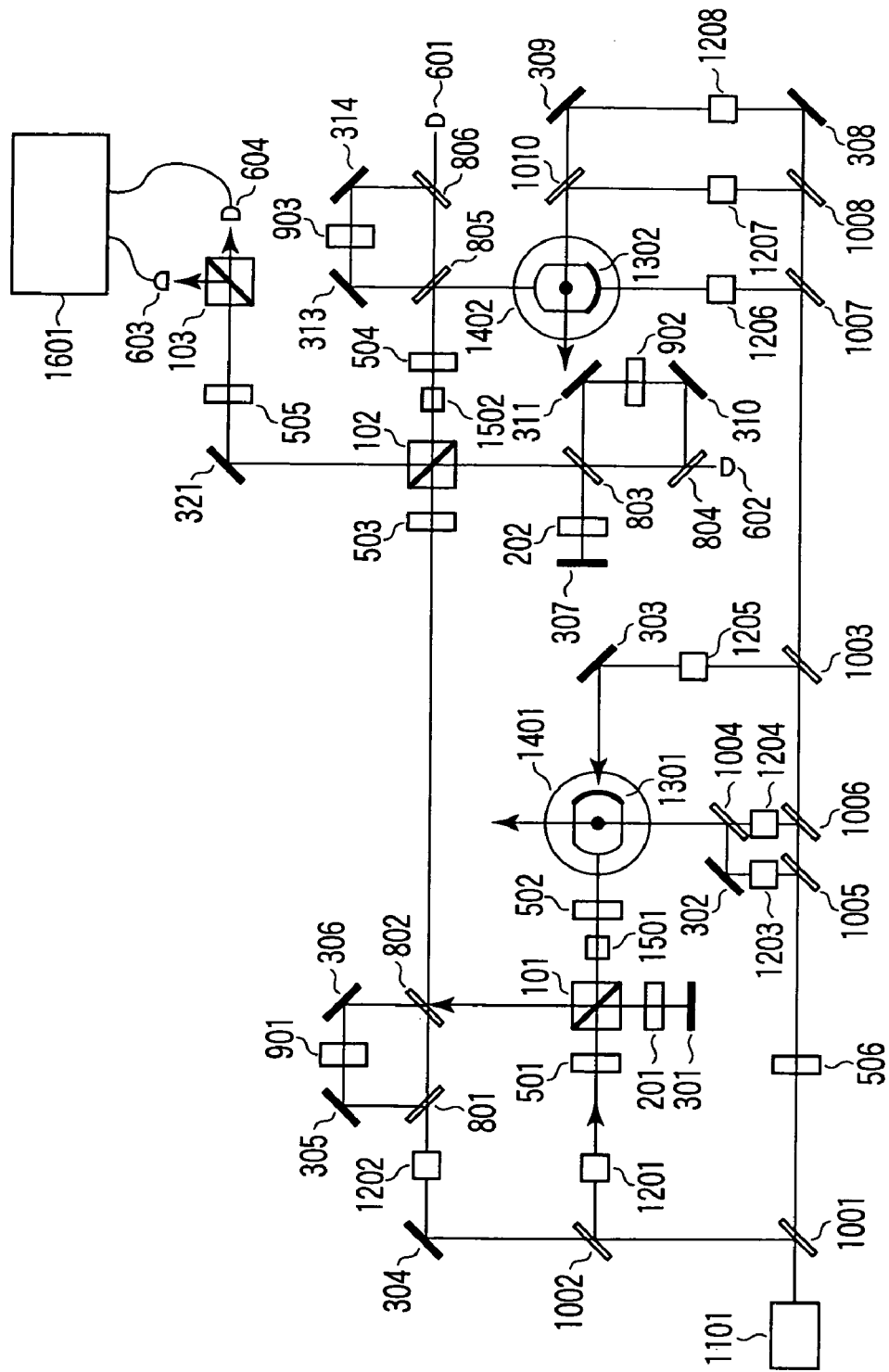
FIG. 17 is a view illustrating a quantum computer for performing a CZ gate operation on two atomic quantum bits, according to example 3.

Referring to FIG. 17, a description will be given of example 3 related to a CZ gate between two atoms.

Since it is necessary to guide a light beam to a cavity 1302 to lastly read the state of an atom in the cavity 1302, an optical system including a cavity 1301 is coupled with an optical system including the cavity 1302 via a ring cavity. As shown in FIG. 17, the ring cavity comprises high reflection mirrors 305 and 306, input mirrors 801 and 802, and cavity length adjuster 901.

Further, the quantum computer shown in FIG. 17 is fundamentally similar in structure to the CZ gate with extensibility shown in FIG. 7, therefore example 3 can also be regarded as an example of the CZ gate with extensibility.

In example 3, to confirm whether a CZ gate operation between two atoms has succeeded, the fact is noticed that a control NOT gate (CNOT) operation can be performed by three gate operations—(an H gate operation on a target bit)→a CZ gate operation→(an H gate operation on a target bit)—. Resulting from the CNOT gate operation,

|0> |0>, |0> |1>, |1> |0>, |1> |1> are respectively changed to

|0> |0>, |0> |1>, |0> |1>, |1> |1>

By conforming whether these changes have occurred or not, it is confirmed whether the CZ gate operation between two atoms has succeeded.

Firstly, one ion in each cavity mode is prepared in |1> by the same method as employed in example 1. Subsequently, two light beams having two frequencies as shown in FIG. 15 is applied to the ion in the cavity 1302, and then an H gate operation is performed by the Raman transition. After that, a weak coherent light beam is applied to the HWP 501. Cavity length adjusters 901, 902 and 903 are all adjusted to cause all ring cavities to serve as high reflection mirrors. Polarization of a light beam is measured by photodetectors 603 and 604. If polarization of a light beam is V-polarization, a control unit 1601 performs nothing, whereas if polarization of a light beam is H-polarization, the control unit 1601 performs a Z gate operation on the ion in the cavity 1301. Lastly, an H gate operation is performed on the ion in the cavity 1302 by the Raman transition.

If the CZ gate operation between two atoms has succeeded, the state of the ion in the cavity 1301 has to be kept at |1>, and the state of the ion in the cavity 1302 has to be shifted to |0>. To confirm this, the states of the ions in the cavities 1301 and 1302 are checked in this order.

To check the state of the ion in the cavity 1301, the cavity length adjuster 901 is adjusted to cause the ring cavity including it to serve as a high reflection mirror, and the cavity length adjusters 902 and 903 are adjusted to cause the ring cavities including them to serve as high transmission mirrors. After that, a weak coherent light beam is guided to the cavity 1301 through the HWP 501, and polarization of the light beam is measured by the photodetectors 601 and 602.

To check the state of the ion in the cavity 1302, the cavity length adjuster 901 is adjusted to cause the ring cavity including it to serve as a high transmission mirror, and the cavity length adjusters 902 and 903 are adjusted to cause the ring cavities including them to serve as high reflection mirrors. After that, a weak coherent light beam is guided from the input mirror 801 to the cavity 1302 through the HWP 503, and polarization of the light beam is measured by the photodetectors 603 and 604.

As a result of the measurement, an H-polarized light beam was observed in the case of the ion in the cavity 1301, and a V-polarized light beam was observed in the case of the ion in the cavity 1302. From this, it was confirmed that the states of the ions in the cavities 1301 and 1302 were |1> and |0>, respectively.

Similarly, if the initial states of the ions are |1> and |0>, |0> and |1>, and |0> and |0>, they have to be changed, after the above operation is performed thereon, to |1> and |1>, |0> and |1>, and |0> and |0>, respectively.

It was confirmed that these changes occurred. The results of the measurements indicate that CZ gate operations were realized between the two atoms (ions).

EXAMPLE 4

Figure 18:
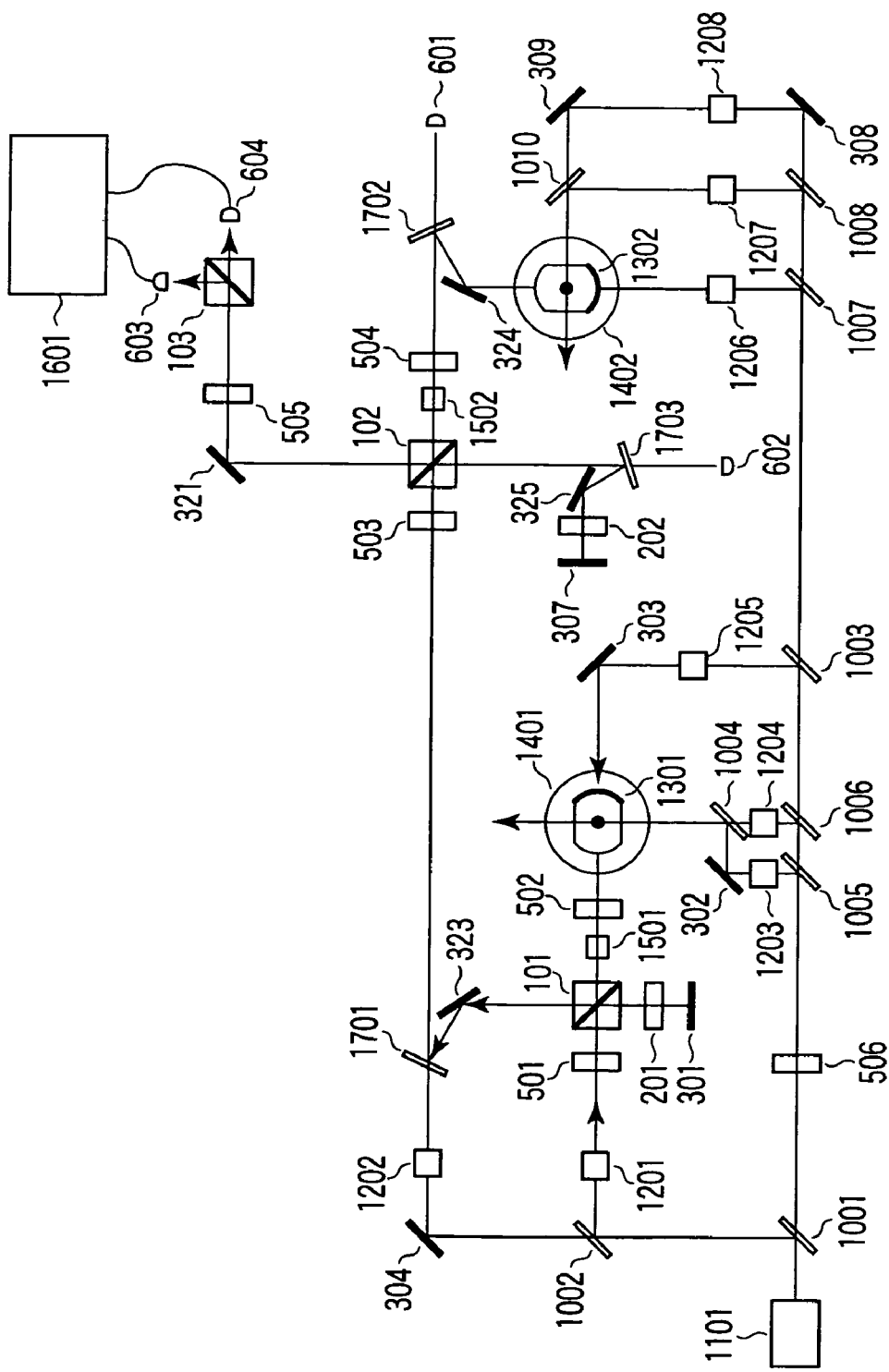
FIG. 18 is a view illustrating a quantum computer, according to example 4, in which etalons are used as the switching mirrors.

Referring then to FIG. 18, a description will be given of example 4 in which an etalon is used as a switching mirror. Example 4 differs from example 3 shown in FIG. 17 only in that in the former, etalons with a finesse of about 100 is used instead of the ring cavities. The other structures are similar to those of example 3.

In example 4, an incident light beam enters each etalon at an incident angle of about 5 degrees. After CZ gate operations were performed on atoms as in example 3, correct results were acquired.

EXAMPLE 5

Figure 19:
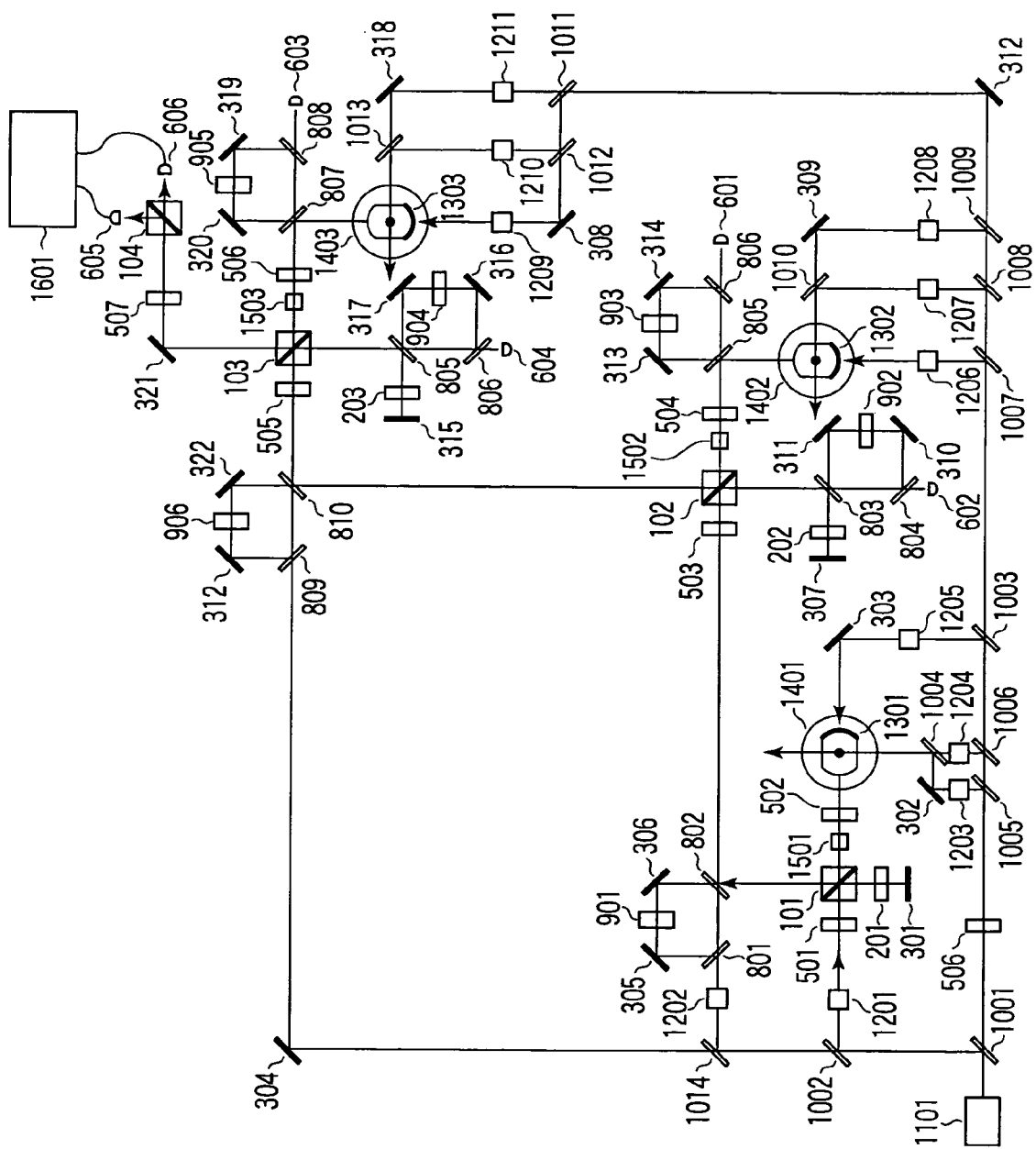
FIG. 19 is a view illustrating a quantum computer, according to example 5, for performing a CZ gate operation on quantum bits corresponding to two atoms contained in cavities that are not adjacent to each other.

Referring to FIG. 19, a description will be given of example 5 in which a CZ gate operation is performed on quantum bits corresponding to atoms contained in cavities that are not adjacent to each other as shown in FIG. 12.

Figure 14:
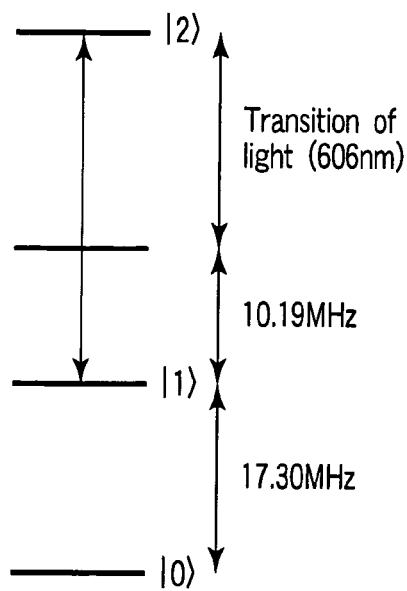
FIG. 14 is a view illustrating the energy level of a $Pr^{+3}$ ion doped in $Y_2SiO_5$ crystal.

In example 5, a $Pr^{3+}$ ion is used as an ion in each cavity as in example 1. Since the $Pr^{3+}$ ion has three ground states as shown in FIG. 14, the ground state other than |0> and |1>, i.e., |3>, is utilized.

Firstly, the state of an ion in a cavity 1302 in FIG. 19 was set to |3>. Cavity length adjusters 901 to 906 were all adjusted to cause all ring cavities to serve as high reflection mirrors. The states of the ions in cavities 1301 and 1303 were both set to |1>. Next, a CNOT gate operation was performed on the ions in the cavities 1301 and 1303 in the same manner as in example 3.

Thereafter, the cavity length adjusters 902 and 903 were adjusted so that the corresponding ring cavities serve as high transmission mirrors, whereby a weak coherent light beam is guided to an HWP 501, and the state of the ion in the cavity 1301 was read by photodetectors 601 and 602. Subsequently, the cavity length adjuster 906 was adjusted so that the corresponding ring served as a high transmission mirror, and the cavity length adjusters 904 and 905 were adjusted so that the corresponding ring cavities served as high reflection mirrors. After that, a weak coherent light beam is guided to the HWP 505, and a CZ gate operation on the ion in the cavity 1303 and the photon was performed, whereby the state of the ion in the cavity 1303 was read by photodetectors 605 and 606. As a result, it was found that the states of the ions in the cavities 1301 and 1303 were |1> and |0>, respectively.

Similar operations were performed with the initial states of the ions in the cavities 1301 and 1303 set to |0> and |0>, |0> and |1>, and |1> and |0>, respectively. As a result, their states were changed to |0> and |0>, |0> and |1>, and |1> and |1>, respectively. These results indicate that CZ gate operations on the atoms in the cavities 1301 and 1303 that are not adjacent to each other succeeded.

The quantum computer and quantum computation method of the embodiments are extensible in the number of quantum bits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quantum computer comprising:
a plurality of optical systems arranged in series each of the plurality of optical systems comprising:
  a first half-wave plate which receives a light beam;
  a first polarizing beam splitter which receives a light beam passing through the first half-wave plate;
  a first switching mirror which reflects or transmits a first light beam transmitted by the first polarizing beam splitter;
  a first photodetector which detects the first light beam transmitted by the first switching mirror;
  a first polarization rotator which receives the first light beam reflected by the first switching mirror;
  an optical cavity which receives the first light beam passing through the first polarization rotator and contains an atom;
  a second switching mirror which reflects or transmits a second light beam reflected by the first polarizing beam splitter;
  a second photodetector which detects the second light beam transmitted by the second switching mirror;
  a second polarization rotator which receives the second light beam reflected by the second switching mirror; and
  a high reflection mirror which receives the second light beam passing through the second polarization rotator and reflects the received light beam in a direction opposite to an incident direction of the received light beam, the first polarization beam splitter outputting a third light beam received from the first switching mirror or the second switching mirror to adjacent one of the optical systems;
a plurality of third switching mirrors each provided between adjacent two optical systems, each of the third switching mirrors reflecting or transmitting a light beam output from one of the two optical systems;
a plurality of light sources each providing the light beam to the corresponding optical system; and
a measurement system which measures polarization of an incoming light beam, the measurement system comprising:
  a second half-wave plate which receives the incoming light beam output from the last-stage optical system, the last-stage optical system arranged at an down end of the plurality of optical systems;
  a second polarizing beam splitter which receives the incoming light beam passing through the second half-wave plate; and
  a pair of third and fourth photodetectors, the third photodetector detecting the incoming light beam reflected by the second polarizing beam splitter, the fourth photodetector detecting the incoming light beam transmitted by the second polarizing beam splitter.

2. The computer according to claim 1, wherein the optical cavity comprises an input mirror and at least one reflection mirror, the input mirror receiving the first light beam passing through the first polarization rotator,
the optical cavity reflects the first light beam in a direction opposite to an incident direction of the first light beam,
the atom contained in the optical cavity has three energy levels, a transition frequency corresponding to a transition between two levels of the three energy levels being equal to a resonant frequency of the optical cavity, the other energy level being uncoupled with modes of the optical cavity.

3. The computer according to claim 1, wherein the optical cavity includes an input mirror and at least one reflection mirror which receives the first light beam passing through the first polarization rotator,
the optical cavity reflects the first light beam in a direction opposite to an incident direction of the first light beam,
the atom contained in the optical cavity has four energy levels, a transition frequency corresponding to a transition between two levels of the four energy levels being equal to a resonant frequency of the optical cavity, the other two energy levels being uncoupled with modes of the optical cavity.

4. The computer according to claim 1, wherein each of the first switching mirror, the second switching mirror and the third switching mirror comprise:
  two input/output mirrors having a same transmission factor;
  at least one high reflection mirror; and
  a cavity length adjuster which adjusts a cavity length depending on whether an incident light beam is reflected or transmitted.

5. The computer according to claim 4, the cavity length adjuster including an electrooptic modulator or a piezoelectric transducer.

6. The computer according to claim 1, wherein each of the first switching mirror, the second switching mirror and the third switching mirror comprise an etalon having an adjustable incident angle.

7. The computer according to claim 1, wherein the light beam is a coherent light beam or a single-photon pulse.

8. The computer according to claim 1, wherein the first polarization rotator is a half-wave plate or a Faraday rotator.

9. The computer according to claim 1, wherein the atom is an impurity atom contained in crystal.

10. A quantum computer comprising:
a plurality of optical systems arranged in series each of the plurality of optical systems comprising:
  a first half-wave plate which receives a light beam;
  a first polarizing beam splitter which receives a light beam passing through the first half-wave plate;
  a first switching mirror which reflects or transmits a first light beam transmitted by the first polarizing beam splitter;
  a first photodetector which detects the first light beam transmitted by the first switching mirror;
  a first polarization rotator which receives the first light beam reflected by the first switching mirror;
  an optical cavity which receives the first light beam passing through the first polarization rotator and contains an atom;
  a second switching mirror which reflects or transmits a second light beam reflected by the first polarizing beam splitter;
  a second photodetector which detects the second light beam transmitted by the second switching mirror;
  a second polarization rotator which receives the second light beam reflected by the second switching mirror; and
  a high reflection mirror which receives the second light beam passing through the second polarization rotator and reflects the received light beam in a direction opposite to an incident direction of the received light beam, the first polarization beam splitter outputting a third light beam received from the first switching mirror or the second switching mirror to adjacent one of the optical systems; and a plurality of third switching mirrors each provided between adjacent two optical systems, each of the third switching mirrors reflecting or transmitting a light beam output from one of the two optical systems.

11. The computer according to claim 10, wherein the optical cavity comprises an input mirror and at least one reflection mirror the input mirror receiving the first light beam passing through the first polarization rotator, the optical cavity reflects the first light beam in a direction opposite to an incident direction of the first light beam, the atom contained in the optical cavity has three energy levels, a transition frequency corresponding to a transition between two levels of the three energy levels being equal to a resonant frequency of the optical cavity, the other energy level being uncoupled with modes of the optical cavity.

12. The computer according to claim 10, wherein the optical cavity includes an input mirror and at least one reflection mirror which receives the first light beam passing through the first polarization rotator, the optical cavity reflects the first light beam in a direction opposite to an incident direction of the first light beam, the atom contained in the optical cavity has four energy levels, a transition frequency corresponding to a transition between two levels of the four energy levels being equal to a resonant frequency of the optical cavity, the other two energy levels being uncoupled with modes of the optical cavity.

13. The computer according to claim 10, wherein each of the first switching mirror, the second switching mirror and the third switching mirror comprise:

two input/output mirrors having a same transmission factor;
at least one high reflection mirror; and
a cavity length adjuster which adjusts a cavity length depending on whether an incident light beam is reflected or transmitted.

14. The computer according to claim 13, the cavity length adjuster including an electrooptic modulator or a piezoelectric transducer.

15. The computer according to claim 10, wherein each of the first switching mirror, the second switching mirror and the third switching mirror comprise an etalon having an adjustable incident angle.

16. The computer according to claim 10, wherein the light beam is a coherent light beam or a single-photon pulse.

17. The computer according to claim 10, wherein the first polarization rotator is a half-wave plate or a Faraday rotator.

18. The computer according to claim 10, wherein the atom is an impurity atom contained in crystal.

19. A method of performing quantum computation using the quantum computer according to claim 1, the method comprising:

guiding a light beam to the first half-wave plate of a $k^{th}$ optical system from the switching mirror between a $(k-1)^{th}$ optical system and the $k^{th}$ optical system, k indicating an integer from 1 to total number of the optical systems;

setting each of the first switching mirror and the second switching mirror of the $k^{th}$ optical system to reflect the light beams passing through the first polarizing splitter of the $k^{th}$ optical system and guide the passing light beams to the first polarization rotator and the second polarization rotator of the $k^{th}$ optical system;

setting one of the third switching mirror corresponding to the $k^{th}$ optical system to reflect the light beams reflected by the optical cavity and the high reflection mirror of the $k^{th}$ optical system and mixed at the polarizing beam splitter of the $k^{th}$ optical system and guide the light beams to a $(k+1)^{th}$ optical system;

setting each of the first switching mirror and the second switching mirror of the $(k+1)^{th}$ optical system to reflect the light beams passing through the first polarizing splitter of the $(k+1)^{th}$ optical system and guide the passing light beams to the first polarization rotator and the second polarization rotator of the $(k+1)^{th}$ optical system;

setting one of the third switching mirrors corresponding to the $(k+1)^{th}$ optical system to reflect the light beams reflected by the optical cavity and the high reflection mirror of the $(k+1)^{th}$ optical system and mixed at the polarizing beam splitter of the $(k+1)^{th}$ optical system and guide the light beams to a $(k+2)^{th}$ optical system;

setting each of the first switching mirror and the second switching mirror of the $(k+2)^{th}$ optical system to transmit the light beams passing through the first polarizing splitter of the $(k+2)^{th}$ optical system and guide the passing light beams to the first photodetector and the second photodetector of the $(k+_2)^{th}$ optical system; and performing a controlled phase flip gate operation on quantum bits expressed by states of two atoms each of which are in the optical cavities of the $k^{th}$ optical system and the $(k+1)^{th}$ optical system, by performing or failing to perform, based on the measurement result of the detectors in the $(k+2)^{th}$ optical system, a phase flip gate operation on the quantum bit expressed by the state of the atom in the optical cavity of the $k^{th}$ optical system.

20. The method according to claim 19, wherein the light beam is a coherent light beam or a single-photon pulse.

21. A method of performing quantum computation using the quantum computer according to claim 1, the method comprising:

guiding a light beam to the first half-wave plate of a $k^{th}$ optical system from the switching mirror between a $(k-1)^{th}$ optical system and the $k^{th}$ optical system, k indicating an integer from 1 to total number of the optical systems;

setting each of the first switching mirror and the second switching mirror of the $k^{th}$ optical system to reflect the light beams passing through the first polarizing splitter of the $k^{th}$ optical system and guide the passing light beams to the first polarization rotator and the second polarization rotator of the $k^{th}$ optical system;

setting one of the third switching mirror corresponding to the $k^{th}$ optical system to reflect the light beams reflected by the optical cavity and the high reflection mirror of the $k^{th}$ optical system and mixed at the polarizing beam splitter of the $k^{th}$ optical system and guide the light beams to a $(k+1)^{th}$ optical system;

setting each of the first switching mirror and the second switching mirror of the $(k+1)^{th}$ optical system to transmit the light beams passing through the first polarizing splitter of the $(k+1)^{th}$ optical system and guide the passing light beams to the first photodetector and the second photodetector of the $(k+1)^{th}$ optical system; and reading a quantum bit expressed by a state of an atom in the optical cavity of the $k^{th}$ optical system, based on the measurement result of the detectors in the $(k+1)^{th}$ optical system.

22. The method according to claim 21, wherein the light beam is a coherent light beam or a single-photon pulse.

23. A method of performing quantum computation using the quantum computer according to claim 3, comprising:

shifting states of atoms, contained in $(k+1)^{th}$ to $(k+n-1)^{th}$ optical systems, to one of two energy levels that are uncoupled with the cavity mode, k indicating an integer from 1 to a total number of the optical systems, n indicating an integer greater than 1;

guiding a light beam to the first half-wave plate of a $k^{th}$ optical system from the switching mirror between a $(k-1)^{th}$ optical system and $k^{th}$ optical system;

setting each of the first switching mirror and the second switching mirror of the $k^{th}$ optical system to reflect the light beams passing through the first polarizing splitter of the $k^{th}$ optical system and guide the passing light beams to the first polarization rotator and the second polarization rotator of the $k^{th}$ optical system;

setting one of the third switching mirrors corresponding to the $k^{th}$ optical system to a $(k+n-1)^{th}$ optical system to reflect the light beams reflected by the optical cavity and the high reflection mirror of the $k^{th}$ optical system and mixed at the polarizing beam splitter of the $k^{th}$ optical system and guide the light beams to a $(k+n)^{th}$ optical system;

setting each of the first switching mirror and the second switching mirror of the $(k+n)^{th}$ optical system to reflect the light beams passing through the first polarizing splitter of the $(k+n)^{th}$ optical system and guide the passing light beams to the first photodetector and the second photodetector of the $(k+n)^{th}$ optical system;

setting one of the third switching mirror corresponding to the $(k+n)^{th}$ optical system to reflect the light beams reflected by the optical cavity and the high reflection mirror of the $(k+n)^{th}$ optical system and mixed at the polarizing beam splitter of the $(k+n)^{th}$ optical system and guide the light beams to a $(k+n+1)^{th}$ optical system;

setting each of the first switching mirror and the second switching mirror of the $(k+n+1)^{th}$ optical system to transmit the light beams passing through the first polarizing splitter of the $(k+n+1)^{th}$ optical system and guide the passing light beams to the first photodetector and the second photodetector of the $(k+n+1)^{th}$ optical system; and performing a controlled phase flip gate operation on quantum bits expressed by the states of two atoms each of which are in the optical cavities of the $k^{th}$ optical system and the $(k+n)^{th}$ optical system, by performing or failing to perform, based on a measurement result of the detectors in the $(k+n+1)^{th}$ optical system, a phase flip gate operation on the quantum bit expressed by the state of the atom in the optical cavity of the $k^{th}$ optical system.

24. A method of performing quantum computation using the quantum computer according to claim 12, comprising:

shifting states of atoms, contained in $(k+1)^{th}$ to $(k+n-1)^{th}$ optical systems, to one of two energy levels that are uncoupled with the cavity mode, k indicating an integer from 1 to a total number of the optical systems, n indicating an integer greater than 1;

guiding a light beam to the first half-wave plate of a $k^{th}$ optical system from the switching mirror between a $(k-1)^{th}$ optical system and $k^{th}$ optical system;

setting each of the first switching mirror and the second switching mirror of the $k^{th}$ optical system to reflect the light beams passing through the first polarizing splitter of the $k^{th}$ optical system and guide the passing light beams to the first polarization rotator and the second polarization rotator of the $k^{th}$ optical system;

setting one of the third switching mirrors corresponding to the $k^{th}$ optical system to a $(k+n-1)^{th}$ optical system to reflect the light beams reflected by the optical cavity and the high reflection mirror of the $k^{th}$ optical system and mixed at the polarizing beam splitter of the $k^{th}$ optical system and guide the light beams to a $(k+n)^{th}$ optical system;

setting each of the first switching mirror and the second switching mirror of the $(k+n)^{th}$ optical system to reflect the light beams passing through the first polarizing splitter of the $(k+n)^{th}$ optical system and guide the passing light beams to the first photodetector and the second photodetector of the $(k+n)^{th}$ optical system;

setting one of the third switching mirror corresponding to the $(k+n)^{th}$ optical system to reflect the light beams reflected by the optical cavity and the high reflection mirror of the $(k+n)^{th}$ optical system and mixed at the polarizing beam splitter of the $(k+n)^{th}$ optical system and guide the light beams to a $(k+n+1)^{th}$ optical system;

setting each of the first switching mirror and the second switching mirror of the $(k+n+1)^{th}$ optical system to transmit the light beams passing through the first polarizing splitter of the $(k+n+1)^{th}$ optical system and guide the passing light beams to the first photodetector and the second photodetector of the $(k+n+1)^{th}$ optical system; and performing a controlled phase flip gate operation on quantum bits expressed by the states of two atoms each of which are in the optical cavities of the $k^{th}$ optical system and the $(k+n)^{th}$ optical system, by performing or failing to perform, based on a measurement result of the detectors in the $(k+n+_1)^{th}$ optical system, a phase flip gate operation on the quantum bit expressed by the state of the atom in the optical cavity of the $k^{th}$ optical system.

* * * * *